Figure 1:
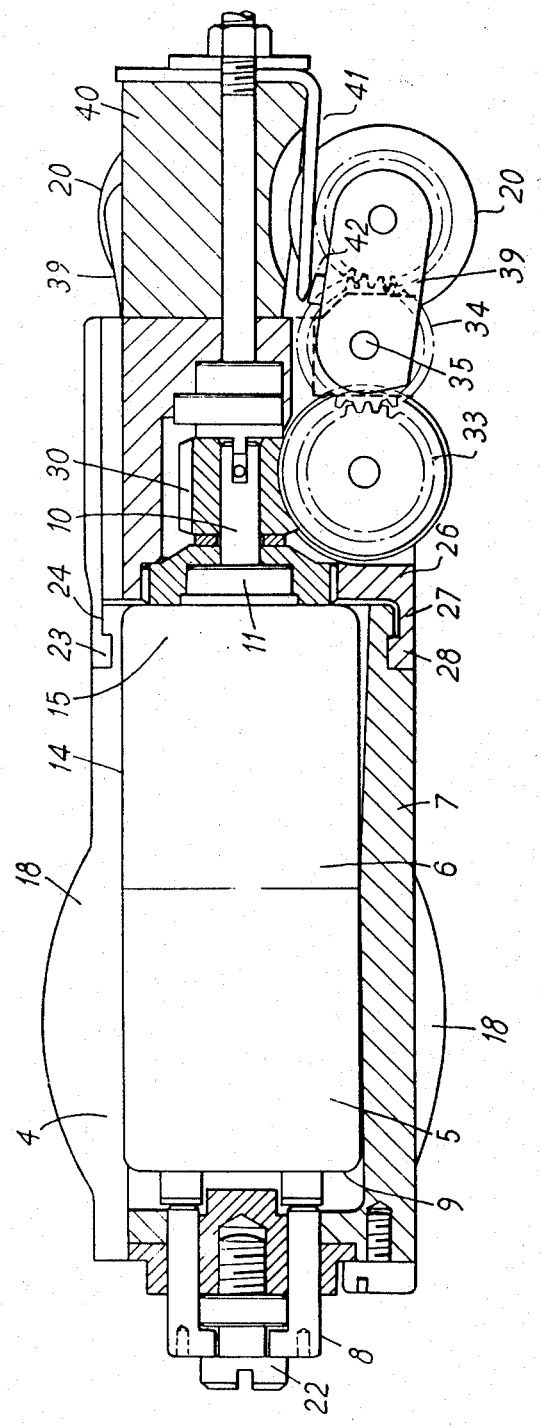

United States Patent [19]

Chapman

[11] 4,050,384
[45] Sept. 27, 1977

[54] TUBE INSPECTION AND SERVICING APPARATUS

[75] Inventor: John Edward Chapman, London, England

[73] Assignee: Babcock & Wilcox Limited, London, England

[21] Appl. No.: 610,237

[22] Filed: Sept. 4, 1975

[30] Foreign Application Priority Data

Sept. 9, 1974 United Kingdom ............... 39317/74

[51] Int. Cl.² .......................................... B61B 13/10
[52] U.S. Cl. ........................... 104/138 G; 15/104.05;
33/178 F; 73/40.5 R; 118/306; 134/166 C;
254/134.5; 308/4 R
[58] Field of Search .................... 104/138 R, 138 G;
254/134.5; 15/104.05, 104.3 R; 118/105, 254,
306, 408, DIG. 10; 134/166 C, 167 C, 168 C,
169 C; 308/4 A, 4 R; 73/40, 40.5 R, 40.5 A;
33/1 H, 178 F

[56] References Cited

U.S. PATENT DOCUMENTS

| | | | |
|---|---|---|---|
| 3,018,086 | 1/1962 | Raney | 254/134.5 |
| 3,089,434 | 5/1963 | Andreasen | 104/138 G |
| 3,484,141 | 12/1969 | Collett | 308/4 A |
| 3,890,905 | 6/1975 | Clavin | 164/138 G |
| 3,895,604 | 7/1975 | Ryan | 118/306 |

FOREIGN PATENT DOCUMENTS 1,197,088  11/1959  France .................. 118/306

Primary Examiner—Robert J. Spar
Assistant Examiner—Randolph A. Reese
Attorney, Agent, or Firm—Kemon & Estabrook

[57] ABSTRACT

An apparatus for insertion into a relatively long tube or conduit in order to inspect or perform operations on the interior thereof. The apparatus includes a device for performing an operation on the tube as well as a plurality of traction units secured at spaced locations along a connecting lead. The traction units include a gear train and one or more driving means.

4 Claims, 4 Drawing Figures

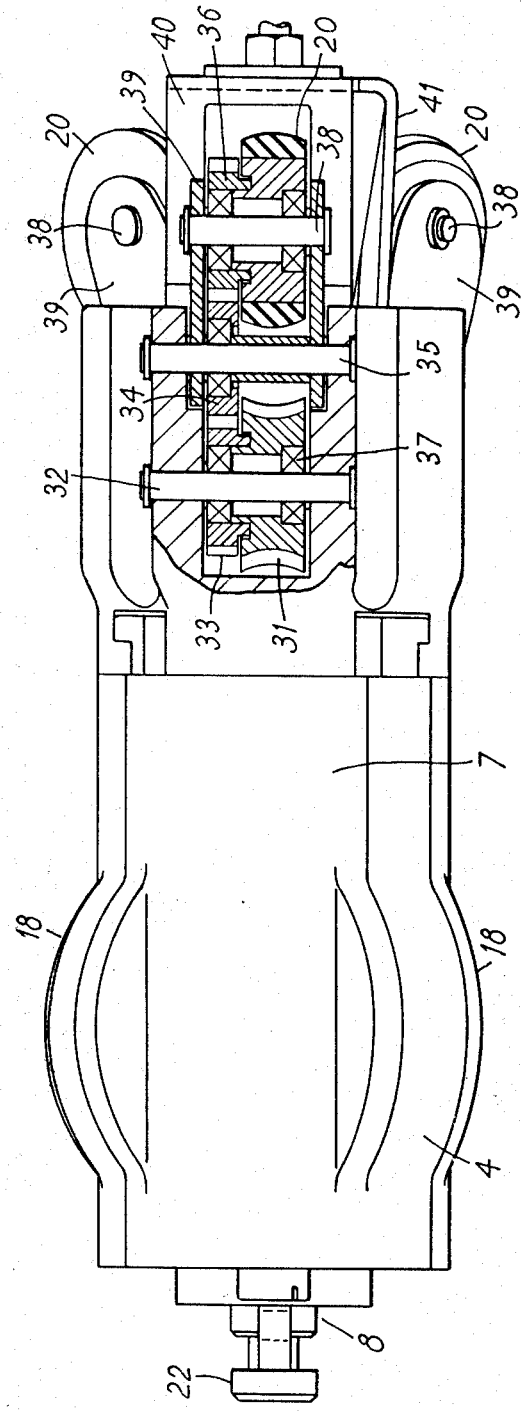

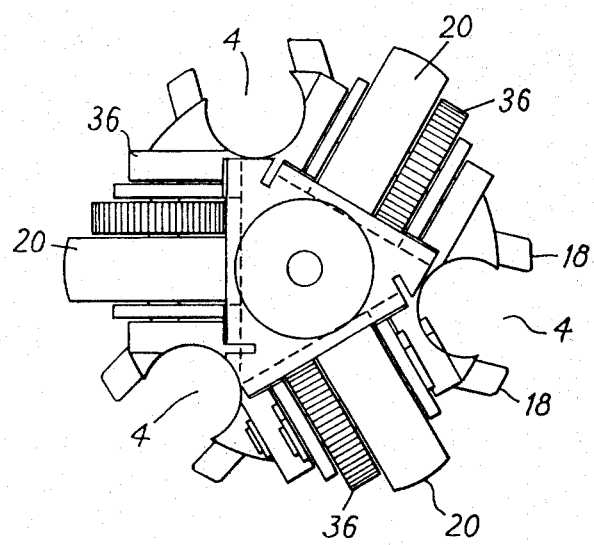
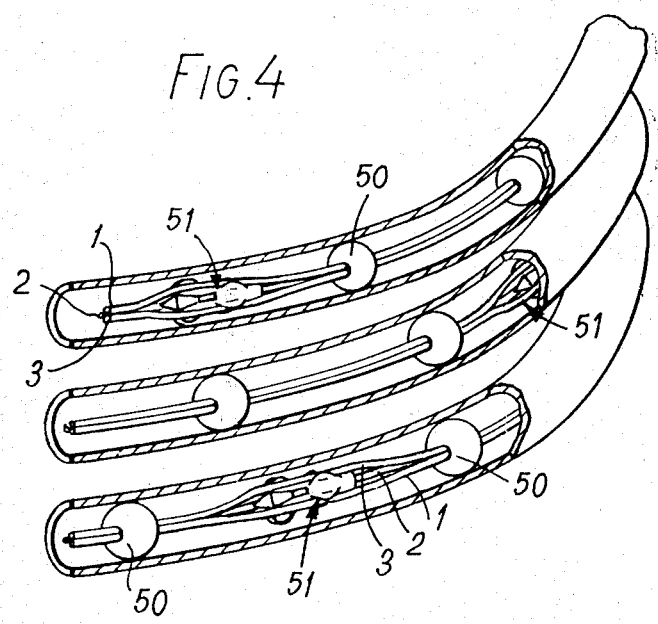

TUBE INSPECTION AND SERVICING APPARATUS

This invention relates to an apparatus for inserting a device for inspecting or performing operations on the interior wall of a relatively long small diameter tube, such as a heat exchanger coil.

Certain large scale industrial heat exchangers utilize tubes formed into coils for spiral, helical, serpentine or other convoluted form and which are filled with one circulating fluid and arranged so as to be in heat exchanging relationship with another fluid circulating around the outside of the tubes. For example some chemical engineering plant and some steam generating equipment found in certain types of electricity generating power stations use boilers (or more correctly heat exchangers which may be vapor generators) in the form of a cylindrical shell or drum packed with co-axial banks of helical coils of small diameter tubes. The precise design and dimensions of the helical tube heat exchanger will vary according to the nature of the plant and will depend on factors such as the nature of the fluids in heat exchanging relationship, the temperatures of the fluids, the volume throughput of the fluids both in the tubes and through the drum, and the materials used for the tubes. However for some typical helical form water-tube boilers made of steel the tube diameters are between 10mm ($\frac{3}{8}$ inch) and 150mm (6inches), particularly 15mm (about ($\frac{1}{2}$ inch) to 50mm (about 2 inches), with axial lengths of tubes from about 3m (10ft) to 300mm (1,000ft), particularly 10m (33ft) to 120m (400ft). A cyclindrical drum of say 3m (10ft) diameter and axial length of 12m (39ft) can accommodate 200 to 300 helical coils of steel tubes with internal cross sectional diameter 25mm (about 1inch) arranged in co-axial banks with multiple starts. A typical tube length in such a configuration might be 100m (300ft) allowing for just 20 turns of a helix with 5 meters of tube per turn. Normally the tighest curves of the tubes of helical coils will be at the point where the tubes are bent to enter the coil banks at the end of the cylinder, but the smallest radius of curvature would be about six times the diameter of the tube itself, and the radius of curvature of the helix will be much greater, for example up to 100 times the tube diameter.

It will be appreciated that the tubes of these coiled heat exchangers are often inaccessibly mounted. Not only may the tubes be inaccessible within the boiler shell but the boiler itself may be inaccessible, for example, in the case of nuclear reactors, within pressure vessels or behind biological shields.

Thus examination of the tubes in situ has not hitherto been possible. At the present time, if an individual tube of a bank of tubes fails and allows the heat exchanging fluids to mix through a leak in the tube wall, it is necessary to seal off the individual tube without knowing whereabouts the tube failed or how or why it failed and with no chance of repairing it. Furthermore, in certain cases physical damage or contamination of associated equipment may result from tube failure as well as a loss of overall efficiency in the heat exchanger. There is no method of preventing this since there is no method of knowing when or why a tube is about to fail.

Clearly it would be of great advantage if inaccessible heat exchanger tubes could be inspected, and, where possible, repairs carried out in situ. For example it would then be possible to decommission a single tube before it failed or perhaps to repair a weld or to spray a protective layer over a weak spot.

However, there has hitherto been the insurmountable problem that since the outsides of the tubes are inaccessible it is in theory necessary to go inside the tubes, but when inserting any rod or cable operated device into a convulated form of tube the friction builds up by the so called "windlass" effect. Thus just as a length of rope wound round a post provides enough friction to hold the rope in tension thereby preventing slip, when any rod or cable is inserted into a coiled tube the friction builds up until further motion is prevented. With helical coils the friction builds up exponentially with the degree of penetration of any rod or cable. The same effect is encountered with any convoluted tube form and in general the more tortuous the tube the more difficult it becomes to push or pull something through it.

It is hoped that the present invention will provide a means of overcoming some of these inherent difficulties.

Accordng to one aspect of the invention there is provided apparatus for conveying a device for inspecting or performing operations on the interior of a tube wall together with a trailing length of connecting lead along the bore of a tube of internal diameter from about 10mm ($\frac{3}{8}$ inch) to 150mm (6 inches) which apparatus includes the connecting lead for the device and a plurality of traction units secured at spaced locations along the lead, each traction unit including an electric motor connected through a reduction gear train to one or more drive means and biasing means adapted to urge one or more of the drive means into frictional driving contact with the internal tube wall, and electrical leads for supplying power to the said traction units from an external source.

Preferably, the traction unit has three drive means outwardly biased so as to make contact with the internal tube wall at three locations angularly spaced apart at approximately 120° to each other and in the same circular plane at right angles to the tube axis.

Conveniently the drive means take the form of wheels or catepillar track arrangements.

Suitably the biasing means are spring loaded devices or resilient members such as cantilever arms or compressible mounting blocks.

Advantageously other portions of the traction unit which may be in contact with the tube wall are provided with motion facilitating means such as low friction skids, bogey wheels or roller bearings.

Desirably, the traction units are approximately equal spaced along the connecting lead, the intervals being such that the intermediate lead is held clear of the tube wall, or the length which makes contact is insufficient to build up any substantial frictional drag.

Additionally the connecting lead portions between the traction units may be provided with anit-friction devices such as a polytetrafluoroethylene (PTFE) sleeve, or PTFE supporting spheres, or more complicated mechanisms incorporating bearings.

The device for inspecting the tube or performing operations on it is not part of this invention and so will not be described in specific detail. It may for example be an ultrasonic testing device, an eddy current testing device, a miniature photographic or television camera or any other device which can be made small enough to pass along a tube of the dimensions specified and collect useful information on the state of the tube wall and either store this until the device is retrieved from the tube or relay it to a location outside the tube during inspection. Alternatively it may be a device for performing operations on the tube wall such as a device for depositing a film for material for example metal, paint, plastic or corrosion inhibitor, or it may be a device for grinding down and removing obturations such as scale build up or deposited films, old welds and the like, or it may be a device for re-welding sections of the tube from within. Many of these devices may need supply tubes of materials such as fluid transmission media to carry ultrasonic or eddy current signals, special gases such as inert gases or gases needed in particular chemical reactions, film-forming materials, or fuels, as well as electrical signals.

The term "connecting lead" is thus to be interpreted widely as including any flexible tubes, fibers, electrical leads, Bowden cables, wires and other carriers or conveyors of energy signals, or pulses, or of fluid material, to and from the device being transported to a location outside the tube.

The connecting lead for the device to be conveyed along the tube and/or the electrical leads for the traction units should preferably be of high tensile strength so that there is very little possibility of it or them snapping under tension while being conveyed along the tube, and also so that in case of a failure in any of the traction units the whole assembly can be pulled out of the tube. However, the leads need not be capable of transmitting compressive forces without kinking. Apart from the leading traction unit (immediately behind the device for inspecting or performing operations on the tube wall during insertion of the device) which will be pushing the said device, the motive force of the other traction units will be employed in pulling the connecting leads through the tube.

Having described the invention in general terms, one embodiment will now be described with reference to the accompanying drawings, in which:

FIG. I is a side elevation view mainly in section, of one traction unit.

FIG. II is a plan view, partly in section, of the traction unit of FIG. 1.

FIG. III is an end elevation of the traction unit of FIGS. 1 and 2.

FIG. IV is a diagrammatic view drawn to a much smaller scale of a cut-away section of a helical boiler tube showing several traction units and the accompanying connecting leads passing through the tube.

The illustrated embodiment of the invention is suitable for inserting a device for inspecting the wall of a hellically coiled heat exchanger tube of internal diameter 25mm (with an upper limit of 25.4mm bore and lower limit of 24.3mm bore). The inspection device (not illustrated) to be inserted in an eddy current probe. The probe comprises a head portion incorporating a sensing device with one or more coils of wire to produce the necessary electrical signals and responses for examining the tube wall together with a motor for rotating the sensing device, and a tail portion incorporating transformers for supplying the correct voltages to energize the head. These portions are mounted on carriages linked through a coupling having a universal joint, so that the carriages can move permitting the portions to negotiate bends in the tube.

A further universal joint coupling links the tail portion of the probe to a first traction unit of a form described in the following paragraphs.

The lead 1 for the probe comprises a cable containing a bundle of six individually insulated wires within an insulating sleeve of 5mm (3/16 inch) external diameter.

The traction unit is provided with a pair of unsulated cables 2 and 3 each of maximum external diameter 5mm (3/16 inch) for supplying direct current electrical energy to the motor of the traction unit. Thus, energization of the motor of the traction unit serves to push the probe through a tube, trailing the cables behind. When the apparatus is in use the cables 2 and 3 and the probe lead 1 lie in three open channels 4 of more or less cylindrical shape running axially along the surface of the traction unit and symmetricaly disposed around it. The open channels can be seen on FIGS. I, II and III. Fixed to the cables, as described later, at intervals of 2mm (6ft) are further traction units. A portion of the apparatus showing several traction units connected to the cables and lead can be seen in FIG. IV.

Each traction unit takes the form of a small wheel driven motorized carriage of superficially cylindrical shape with an overall length of 68mm and maximum diameter of 23mm, excluding the outwardly projecting wheels 20 which are spring-biased to drivingly contact the wall of the tube. FIGS. I and II show the "cylinder" viewed axially and FIG. III shows the substantially circular end-on view.

About half of the length of the carriage is taken up by a housing 7 for a miniature 6 volt direct-current electric motor and a reduction gearbox giving a 52:1 reduction.

The motor is contained within a cylindrical sub-housing 5 and has a light-weight iron-less rotor with a skew winding and operates at about 70% efficiency, being rated as developing 0.32 watts maximum power output at 25° C, rotates at speeds up to 33,600 revolutions per minute under "no-load" conditions and weighs about 8gm. One such motor is that obtainable from Portescap-(UK)Limited under their designation Faulhaber Type 060. The gearbox 6 is also obtainable from Portescap-(UK) Limited is a reduction gearbox contained with a cylindrical metal sub-housing designed to screw onto the motor sub-housing. With the gearbox attached to the motor, the combination is itself of cylindrical form with the electrical contacts 8 for the motor projecting at one end, and the gearbox output shaft 10 and mounting nut 11 at the other end. The overall length of the cylindrical sub-housing of the motor and gearbox combination excluding the above named projections is 27.9mm, the projections including the output shaft adding about 7mm and the diameter of the metal sub-housing being 12mm.

The gearbox and motor sub-housing combination is mounted as a push fit inside a generally cylindrically shaped axial recess 14 within a plastics material housing 7 which is also of generally cylindrical shape having an external length of 32mm and external diameter of 17mm. The plastics material housing 7 is completely open at one end 15 to permit insertion of the motor and gearbox whereas the other end is closed except for a central aperature giving access to the motor contacts 8.

With this arrangement the motor and gearbox combination are accurately located within the cylindrical recess of the plastics material housing 7 with the gearbox output shaft 10 projecting form the open end of the housing by virtue of the motor end-face 9 of the motor and gearbox sub-housing abutting the closed end of the cylindrical recess.

The plastics material housing 7, although of generally cylindrical shape of outside diameter 17mm has three equiangularly spaced (i.e. 120° apart) projections 18 which when the housing is viewed in longitudinal elevation as in FIGS. I and II are each symmetrically curved starting 4mm from the outer end face of the motor end of the plastics material housing, being 18mm long and rising at the highest point to 3mm beyond the cylindrical surface of the plastics material housing, thereby producing an effective outside diameter of 23mm of the housing. The projections, being integral with the plastics material housing, act as support and centering skids for the housing when it is within the heat exchanger coil. Each skid is longitudinally grooved to form an open channel 4 about 4.7 to 5.0mm across running parallel to the axis of the housing, which channel is continued right through the main cylindrical body of the plastics material housing exposing the metal gearbox and motor sub-housing, as can be seen on FIG. I. Each channel accommodates one of the insulated electrical cables of 5mm external diameter holding it as a tight clamped fit against the motor and gearbox sub-housing, clear of the outermost faces of the skids which contact the tube wall.

Mounted on the outside of the motor end of the plastics material motor and gearbox housing 7 (i.e. the closed end of the housing) is a miniature on-off electrical contact switch 22. Suitably this is of the screw variety whereby the screw is turned in the normal clockwise sense to complete the motor circuit and anti-clockwise to break the circuit.

At the open end (gearbox end) 15 of the motor and gearbox plastics material housing, the external diameter of the housing is reduced by thinning the wall over a short length and then a circumferential groove 23 is recessed into the external cylindrical wall, thereby defining an outwardly projecting flange or shoulder 24 at the open end of the plastics material housing.

Adjacent to the gearbox end of the motor and gearbox housing is a secondary gear train assembly or transmission box containing further gear trains within a hollow cylindrical housing 26 also made of plastics material. This housing is of the same overall external diameter and wall thickness as the motor and gearbox housing (excluding the skids) and has the cylindrical wall at the end of the housing adjacent to the motor and gearbox housing slightly thinned by enlargement of the diameter of the hollow recess and then a circumferential groove 27 is recessed into the inner cylindrical wall thereby defining an inwardly projection flange or shoulder 28.

The plastics materials of the motor and gearbox housing and the transmission box housing are both of a sufficient resilience that the shoulders 24 and 28 on the respective housings can be forced past each other to form a resilient snap fit with the shoulder of each housing gripping the circumferential groove in the other housing.

The transmission box contains a worm gear shaft 30 extending co-axialy of, and keyed to, the output shaft 10 of the reduction gear box.

Three equi-angularly spaced, radially extending identical, worm wheels 31 meshing with the worm gear shaft are mounted on shafts 32 which are tangentially extending in relation to the worm gear shaft. Each shaft 32 also carries a spur drive gear wheel 33 alongside and keyed to the respective worm wheel so as to rotate therewith, the worm wheel and spur drive gear being journalled on bearings 37 on the shaft 32. The three shafts 32 are positioned across three axially extending slots in the plastics material housing of the transmission, box the ends of the shafts passing through radially extending holes in the housing and being retained there by circlips.

Idler gear wheels 34, mounted on respective idler shafts 35 positioned parallel to the worm gear shafts 32 across the said axially extending slots, mesh with the drive gear wheels 33 to transmit the drive to pinion wheels 36. These pinion wheels are mounted, together with 11mm diameter, synthetic rubber tired wheels 20, on stub axles 38 carried on arms 39 pivoted on the idler shafts 35. Because the arms 39 are pivoted on the same shafts 35 as the idler gear wheels 34 which transmit the drive from the spur drive gear wheels 33 to the pinion wheels 36, the rubber tired wheels 20 are free to move radially in and out from the body of the housing while still being driven at the same speed.

An extension 40 of the transmission box housing carries three cantilever springs 41 respectively bearing against inwardly directed studs 42 on the arms 39 to urge the arms outwardly regardless of the direction of drive, the axially extending slots in the transmission box housing being continued into the extension to accommodate the gear and tired wheels 36 and 20.

Each traction unit of the type described is fixed to the cables as follows.

The three cables (the one from the probe containing a plurality of individually insulated leads 1, and the two for the motors of the traction units 2 and 3) are clamped together so as to run as a group over most of their length, for example, by fixing to the group at intervals of 250mm a retaining means such as a rubber band to hold them together. Alternatively the retaining means may have two functions, namely holding the cables together and reducing the friction of the cables on the heat exchanger tube wall and is, for example, a "Teflon" sphere of 23mm diameter with a central diameter hole of about 12mm cross section to accommodate the cables and hold them clear of the tube walls. Such a "Teflon" sphere is shown at 50 in FIG. IV. At required intervals, for example, every 2 meters along the length of the cables, the three cables are separated and a traction unit inserted between the cables and the three cables are then pushed as a tight fit into the grooves or channels 4 along the skids on the motor housing. The traction units are shown as 51 in FIG. IV. A tapping from each of the two cables which supply power to the motors is then taken to connect the motor and its switch into the circuit. This tapping may take the form of a wire with a built in resistor whose value will depend on the distance of the traction unit from the power source for the traction units. In this way each traction unit will be electrically connected in parallel to the power source supplying the motor cables, and for each traction unit the sum of the electrical resistance in the cables from the power source to the traction unit plus the resistor built into the tapping to the traction unit motor will be the same so that each traction unit receives the same power.

Before use, the cables containing the traction units are kept in a convenient form such as in a serpentine form wound round a series of short shelves or racks to hold the traction units.

When it is desired to introduce the inspection device into a heat exchanger coil, the probe is connected to the end of the cable and this is fed manually into the end of the heat exchanger coil. The necessary recording instruments and power sources are connected to the other end of the probe cable and the motor leads are connected to the power source. Then the first traction unit is switched on by turning the contact screw and the traction unit if fed into the heat exchanger coil. This first traction unit will transport the probe and trailing cables along the coil. The cable is unclipped from its storage rack guided into the tube until the next traction unit is needed. The contact screw is turned and then this traction unit is also fed into the coil. This operation is repeated until the desired degree of penetration of the coil is achieved by the probe. Readings from the probe may be monitored instantly or recorded in a permanent form for example, on a chart. When it is required to remove the probe and its connecting leads, the voltage for the traction units is reduced to zero and then reversed and built up to the full 6 volts again. The traction units will then transport the cable and probe out of the heat exchanger coils fron where the leads and traction units can be put back onto their storage racks.

It will be appreciated that the illustrated embodiment may be varied in a number of ways. For example, the skids may be replaced by small bogey wheels on the housing, the screw contact switch could be replaced by a micro-switch and the cantilever-spring-loaded rotatable arm carrying the driving wheels may be replaced by a single cantilever arm of resilient material.

What I claim is:

1. An apparatus for conveying a device for inspecting or performing operations on the interior of a tube wall together with a trailing length of connecting lead along the bore of a tube which apparatus includes the connecting lead for the device and a plurality of traction units secured at spaced locations along said lead, each traction unit including an electric motor connected through a reduction gear train to one or more drive means, and biasing means adapted to urge one or more of the drive means into frictional driving contact with the internal tube wall, electrical leads for supplying power to said traction units from an external source, and said traction units being electrically connected in parallel to said electrical leads for supplying power to said units.

2. An apparatus according to claim 1 wherein the electrical connections in parallel are through tappings from a pair of electrical leads feeding all the traction units, which tappings are wires incorporating resistors whose values vary according to the distance of the traction unit from the power source.

3. An apparatus as set forth in claim 1 wherein each traction unit has three drive means outwardly biased for contacting the inner surface of the tube wall, each unit having the drive means equally spaced circumferentially from one another with an open channel provided in each unit intermediate said drive means, one of said channels receiving a probe lead and the other channels electrical leads.

4. An apparatus for conveying a device for inspecting or performing operations on the interior of a tube wall together with a trailing length of connecting lead along the bore of a tube which apparatus includes the connecting lead for the device and a plurality of traction units secured at spaced locations along said lead, each traction unit including an electric motor connected through a reduction gear train to one or more drive means, and biasing means adapted to urge one or more of the drive means into frictional driving contact with the internal tube wall, electrical leads for supplying power to said traction units from an external source, and said traction units being spaced from one another in substantially uniform intervals along said connecting lead.

* * * * *